US005352403A

United States Patent [19]
Egley

[11] Patent Number: 5,352,403
[45] Date of Patent: Oct. 4, 1994

[54] ADJUSTABLE TRAINING WHEEL APPARATUS

[76] Inventor: Larry P. Egley, 109 Traveler's Trail, St. Peters, Mo. 63376

[21] Appl. No.: 130,311

[22] Filed: Oct. 1, 1993

[51] Int. Cl.$^5$ .............................................. B62H 7/00
[52] U.S. Cl. ...................................... 280/293; 280/301
[58] Field of Search ........................ 280/293, 301, 7.15

[56] References Cited

U.S. PATENT DOCUMENTS

| | | | |
|---|---|---|---|
| 1,077,210 | 10/1913 | Alesani | 280/293 |
| 2,220,528 | 11/1940 | Kutil | 280/7.1 |
| 2,450,979 | 10/1948 | Moller | 280/293 |
| 2,793,877 | 5/1957 | Meier, Jr. | 280/293 |
| 3,746,367 | 11/1973 | Johannsen | 280/301 |
| 3,877,727 | 4/1975 | Johannsen | 280/301 |
| 4,595,213 | 6/1986 | Tsuchie | 280/293 |
| 4,810,000 | 3/1989 | Saunders | 280/293 |
| 5,064,213 | 11/1991 | Storch | 280/301 |
| 5,100,163 | 3/1992 | Egley et al. | 280/293 |

FOREIGN PATENT DOCUMENTS

| | | |
|---|---|---|
| 0438407 | 2/1925 | Fed. Rep. of Germany ...... 280/293 |
| 585315 | 10/1933 | Fed. Rep. of Germany . |
| 378263 | 7/1936 | Fed. Rep. of Germany . |
| 654471 | 4/1929 | France . |
| 767879 | 7/1934 | France . |
| 511145 | 8/1939 | United Kingdom . |

Primary Examiner—Margaret A. Focarino
Assistant Examiner—Victor E. Johnson
Attorney, Agent, or Firm—Heller & Kepler

[57] ABSTRACT

An improved adjustable training wheel apparatus for attachment to a bicycle as an aid to developing balancing skills when first learning to ride a bicycle, the training wheel apparatus allows a restricted range of adjustably dampened axial movement thereby providing more realistic training by more closely approximating the actual degree of balancing necessary to ride the bicycle without the training wheel apparatus.

10 Claims, 7 Drawing Sheets

ADJUSTABLE TRAINING WHEEL APPARATUS

BACKGROUND OF THE INVENTION

The present invention relates in general to bicycle training wheels and pertains, more particularly, to an improved training wheel apparatus which allows a restricted range of adjustably dampened axial movement. The adjustable training wheel apparatus of this invention is an improvement over conventional fixed training wheels and other adjustable training wheels such as is disclosed in U.S. Pat. No. 5,100,163.

The conventional fixed training wheel provides a pair of side-mounted wheels on a bicycle. The wheels are fixed in place when initially installed on the bicycle. Typically, the initial placement puts the wheels' surface on the ground, thereby providing four wheel stability to the otherwise two wheel bicycle.

As the bicycle rider gains skill and confidence the wheels are adjusted upward with respect to the surface of the ground. The training wheels no longer ride along the ground and the rider must improve his or her balance to ride the bicycle. Eventually the rider learns to ride the bicycle and the training wheels are removed.

With the adjustable training wheel disclosed in U.S. Pat. No. 5,100,163, a bank angle of 10–20 degrees is disclosed in either direction. One drawback of this assembly is that a bank limit feature is provided through the use of complimentary stop tabs on the vertical and horizontal members. This earlier arrangement requires a separate manufacturing step.

Another drawback associated with the earlier arrangement is the lack of a back-up in the event that the associated hinge mechanism fails. A third drawback of the prior assembly is that the spring barrel on the lower frame member and the adjustment mounting on the vertical member both require separate manufacturing and assembly operations.

Accordingly, it is an object of the present invention to provide an improved adjustable training wheel apparatus that is more economical from a manufacturing standpoint. In a preferred embodiment a bank angle of from approximately 7° to 10°, inclusive is allowed. It is believed that this bank angle range provides the desired degree of stability.

Another object of the present invention is to provide an improved hinge design which substantially reduces the stress on the hinge itself and includes a safety back-up in the unlikely event of a partial or complete failure of the hinge apparatus, thereby minimizing the risk of injury to a rider in the event of a failure of the hinge mechanism.

A further object of the present invention is to provide an improved adjustable training wheel assembly that is adapted to compress a dampening member attached to the assembly such that the attachment is located on either side of the point of attachment of the assembly to the bicycle.

Still a further object of the present invention is to provide an improved adjustable training wheel assembly that allows an adjustment of the bank angle that is as uncomplicated changing from one standard bolt length to another standard bolt length.

SUMMARY OF THE INVENTION

To accomplish the foregoing and other objects of this invention there is provided an improved adjustable training wheel apparatus which is attached to a bicycle for assisting the development of balancing skills, particularly when first learning to ride a two-wheel bicycle.

The present invention provides a strut assembly that will support a bicycle rider yet still allow the bicycle to safely sway a restricted amount. The strut assembly is compressed over a range to vary the allowable bank angle of the bicycle. This allows the rider to experience a more natural movement when learning to ride the bicycle, thereby expediting the transition from tricycle to bicycle to larger bicycle.

The degree of bank or sway is controlled by adjusting the strut assembly compression. The compression is reduced as the skill of the rider increases.

The adjustable training wheel apparatus comprises an upper support member, a lower support member, a hinge, a strut assembly, and a wheel.

The adjustable training wheel assembly of the present invention preferably has an upper support member attached to the rear axle of the bicycle. The wheel is attached to the lower support member. The lower portion of the upper support member is attached to the upper portion inner end of the lower support member by the hinge and the upper portion of the upper support member is attached to the second intermediate portion of the lower support member by the strut assembly. The lower support member pivots with respect to the upper support member at the hinge.

The strut assembly dampens the pivoting motion between the upper and lower support arms and restricts the bank angle of the bicycle. In the disclosed embodiment described herein, the bank angle is between 7° and 10°, inclusive.

Also in the preferred embodiment the strut assembly comprises a threaded shaft, a partially compressed spring, a stopping member, and an adjustment member. The combination of the threaded shaft and the stopping member acts to restrict the bank angle. The adjustment member in combination with the stopping member and the threaded shaft allow spring compression adjustment, thereby controlling the degree of swaying motion.

These and other objects and features of the present invention will be better understood and appreciated from the following detailed description of embodiments thereof, selected for purposes of illustration and shown in the accompanying drawing figures.

BRIEF DESCRIPTION OF THE DRAWINGS

PIG. 7 is a bottom plan view of the lower portion of the upper support member showing a plurality of slots.

DETAILED DESCRIPTION

Figure 1:
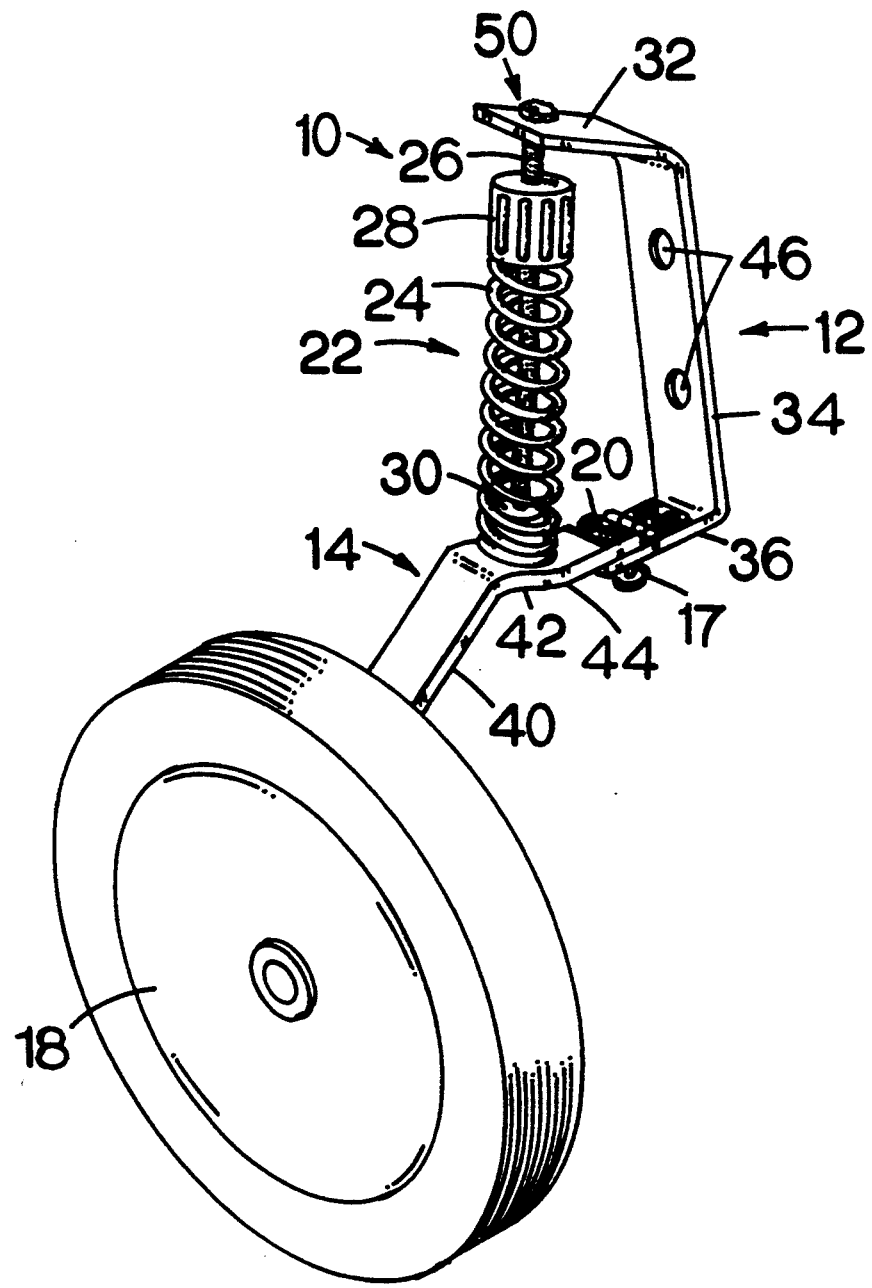
FIG. 1 is a perspective view of the improved adjustable training wheel apparatus constructed in accordance with the present invention.

Referring now to the drawings there is shown a preferred embodiment for the adjustable training wheel apparatus of this invention. The adjustable training wheel apparatus is described in combination with a conventional two-wheel bicycle.

The drawings show the adjustable training wheel apparatus 10 that comprises an upper support member 12, a lower support member 14, a hinge 20, a strut assembly 22, and a wheel 18. The upper support member 12 and the lower support member 14 are joined by the hinge 20. The strut assembly includes a spring 24, a threaded shaft 26, a threaded adjustment member 28, and a stop 30 for limiting motion between the upper support member 12 and the lower support member 14.

A preferred embodiment of the upper support member 12 and the lower support member 14 is illustrated in the drawing figures.

The upper support member 12 has an upper portion 32, an intermediate portion 34, and a lower portion 36. The lower support member 14 has a lower portion 38, a first intermediate portion 40, a second intermediate portion 42, and an upper portion 44. One or more holes or a slot 52 is defined by the lower portion 38 of the lower support member 14. Typically the slot 52 is provided to facilitate attachment and adjustment of the wheel 18.

The entire assembly is attached to the bicycle (not shown) in the conventional manner in which training wheel assemblies are attached to bicycles. One or more holes 46 are defined by the intermediate portion 34 of the upper support member 12. Typically two holes or slots 46 are provided to facilitate attachment of the training wheel assembly to the bicycle.

The upper portion 32 of the upper support member 12 extends outward from the bicycle. In a preferred embodiment the extension is at an angle of approximately 70°. An opening 48 is provided in the upper portion 32 to receive an upper end 50 of the strut assembly 22. The lower portion 36 of the upper support member 12 is provided with one or more slots or holes 16. The holes or slots 16 are used to attach the hinge 20.

The lower portion 38 of the lower support member 14 is slotted with height adjustment slots 52 through which a training wheel 18 is attached to the apparatus 10.

The first intermediate portion 40 of the lower support member 14 extends from the lower portion at an angle of approximately 45° in the illustrated preferred embodiment. The second intermediate portion 42 forms an angle of approximately 65° with the first intermediate portion 40 in the preferred embodiment illustrated in the drawings. An opening 54 receives a strut assembly lower end 56.

The strut assembly upper end and the strut assembly lower end are attached to their respective support members in a conventional manner. The drawings illustrate the use of the bolt head and a nut where the bolt provides the threaded shaft 26.

The drawings illustrate two embodiments of the hinge 20. In view of the ongoing testing program the preferred embodiment has not yet been determined.

Figure 2:
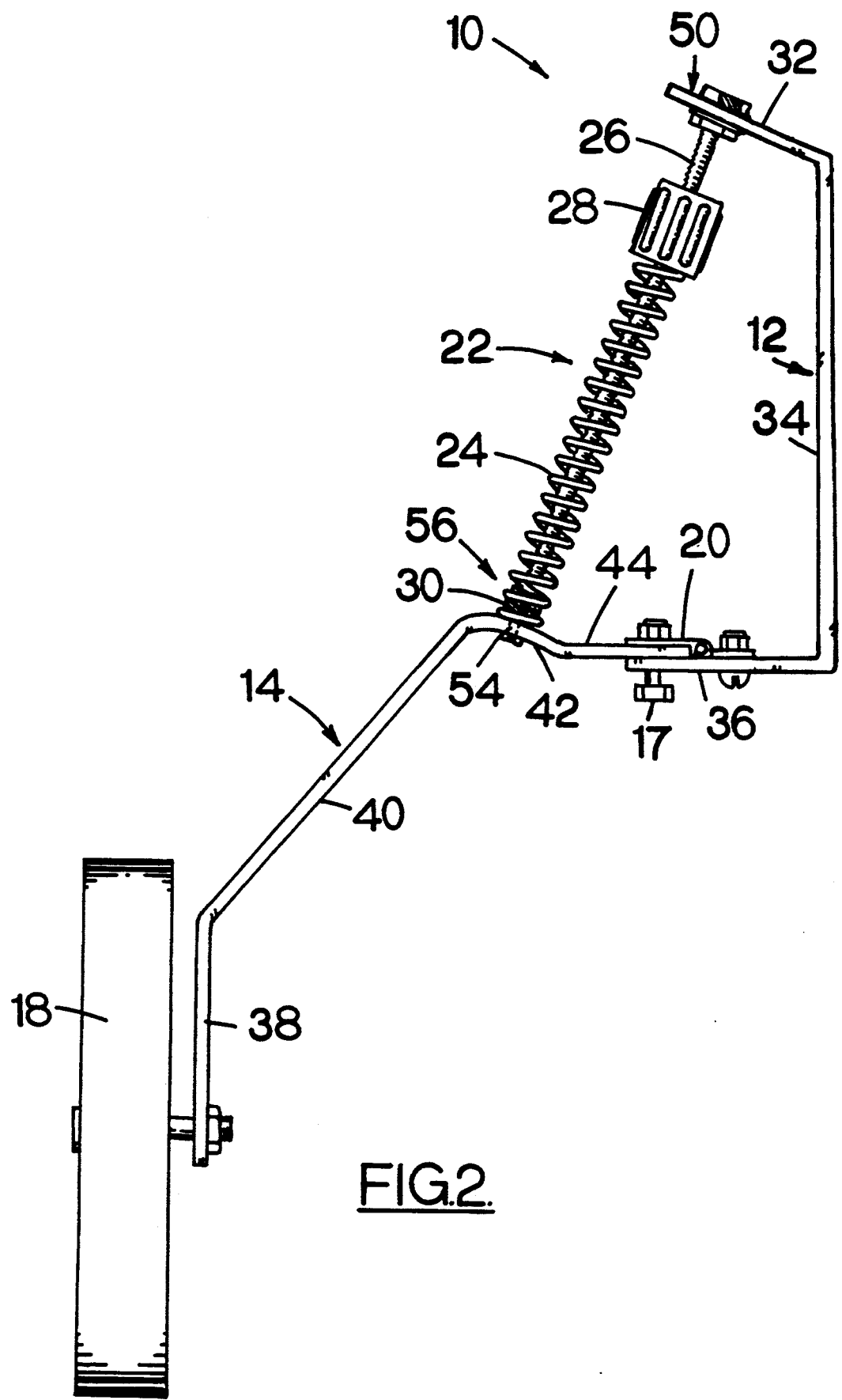
FIG. 2 is a front/rear elevation view showing a preferred embodiment of the improved adjustable training wheel apparatus.
Figure 5:
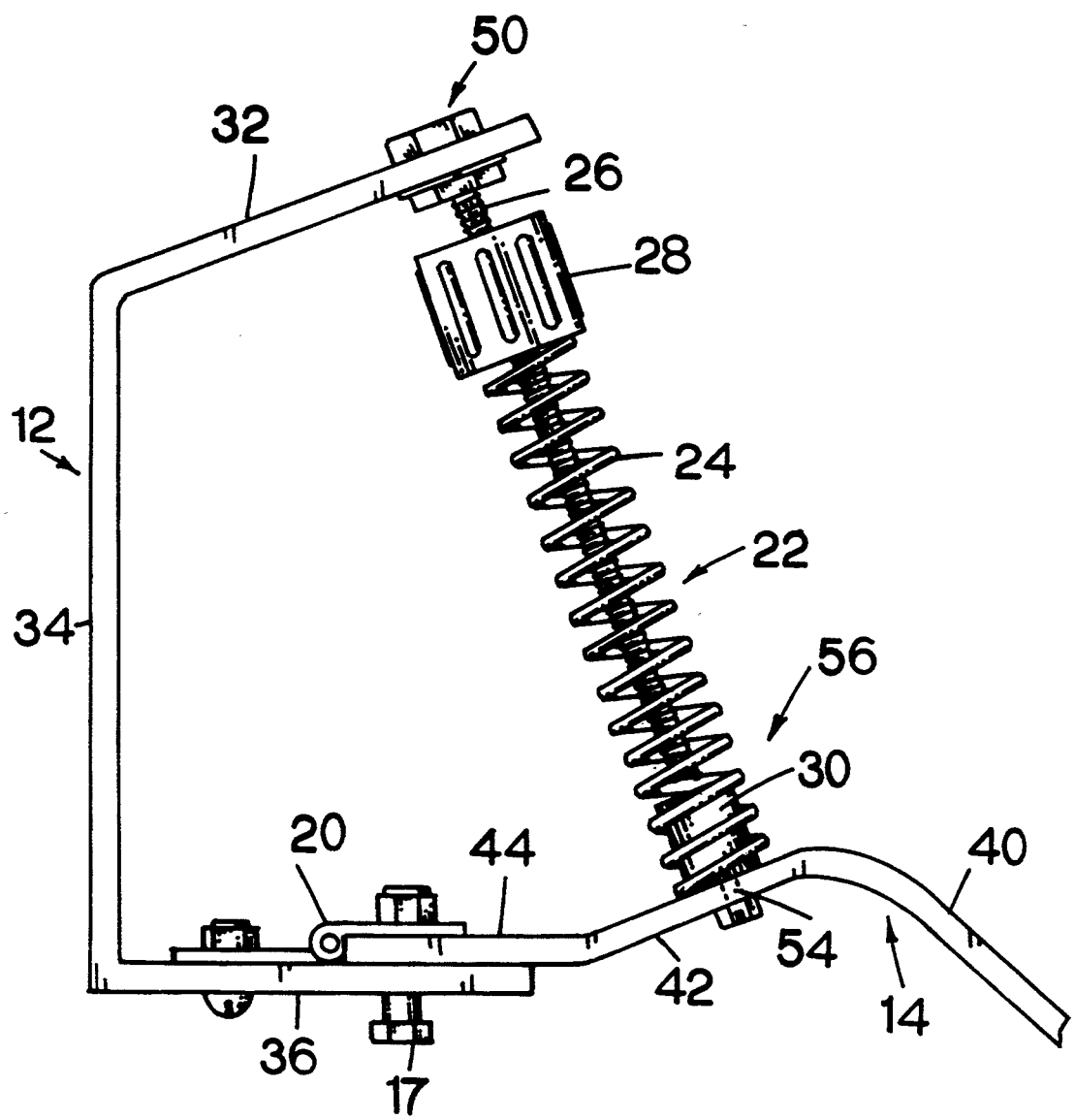
FIG. 5 is a front/rear elevation view showing a preferred embodiment of the upper support member, lower support member, offset hinge, and adjustment member.
Figure 7:
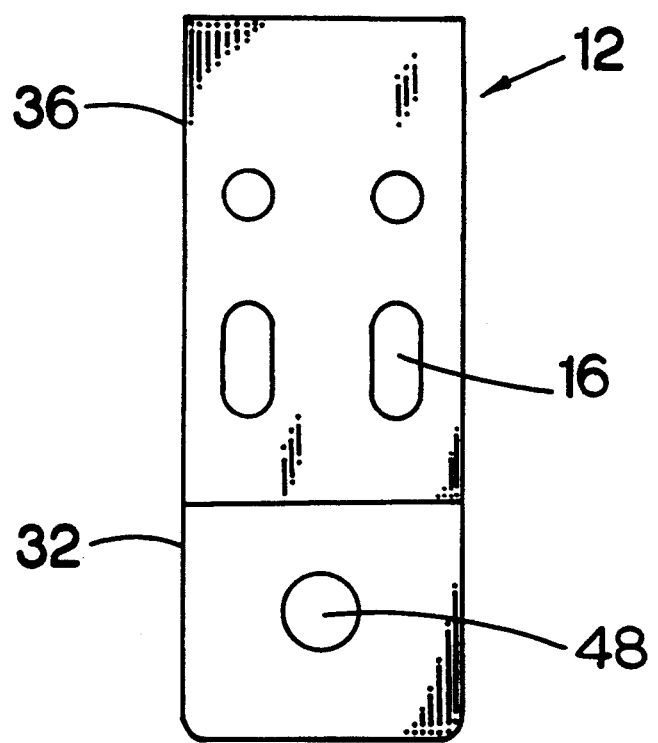
Figure 8:
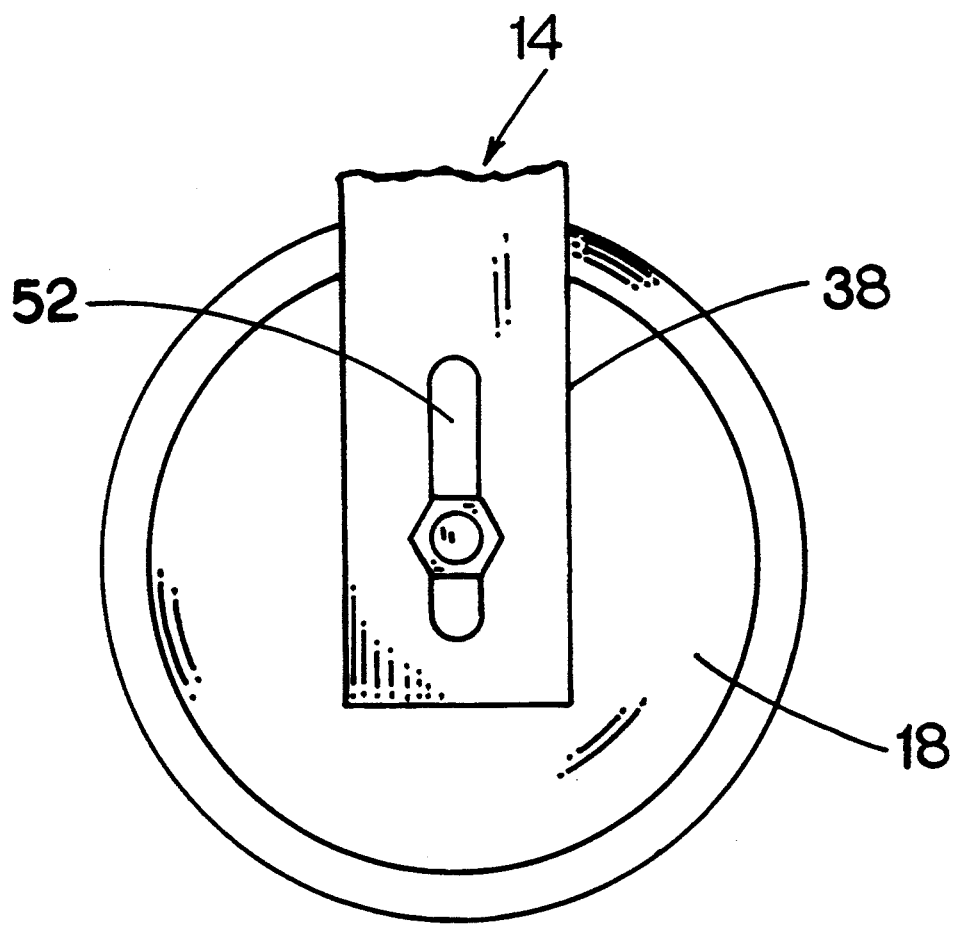
FIG. 8 is a side view of the wheel and the lower portion of the lower support member showing a slot.

FIGS. 1, 2, and 5 show the embodiment in which the adjacent ends of the upper support member and the lower support member overlay one another. FIG. 7 illustrates a preferred hole arrangement. It will be understood that the slots 16 allow the proximate ends of the respective support members to swing on the hinge 20 by providing the necessary clearance for threaded members 17 which are used to assemble the hinge 20 and thereby attach the proximate ends of the support members.

Figure 6:
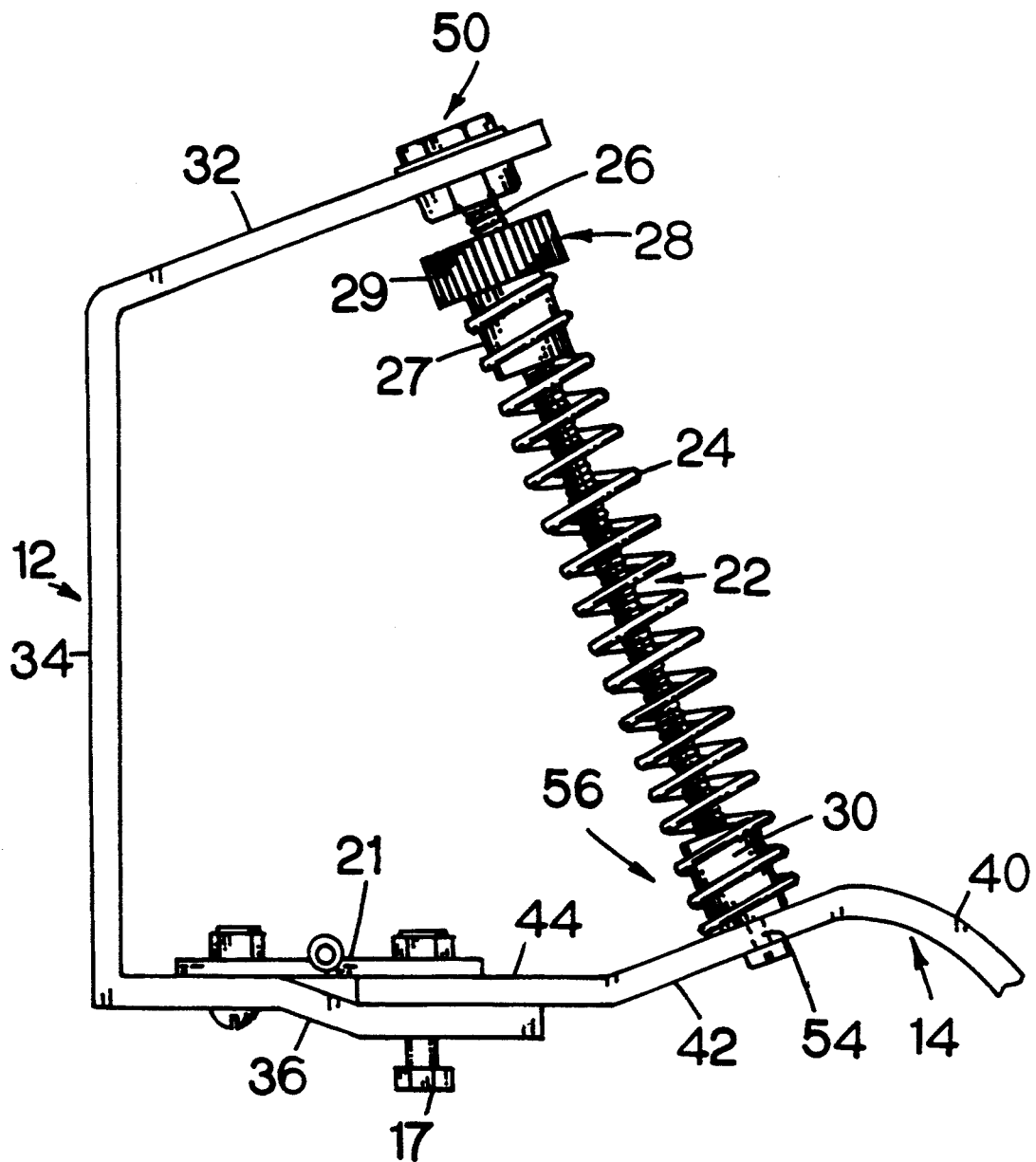
FIG. 6 is a front/rear elevation view showing an alternative preferred embodiment of the upper support member, lower support member, reverse assembly hinge, and adjustment member.

Another embodiment of the hinge 20 is illustrated in FIG. 6 wherein both portions 36 and 44 would have slots generally as shown in FIG. 7 to allow the swinging movement of the hinge and members 17.

Figure 3:
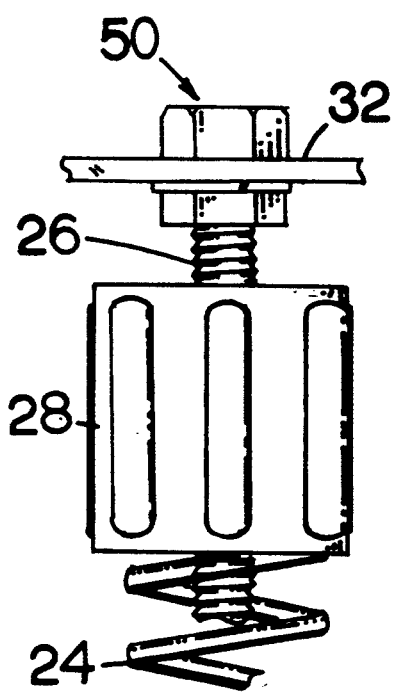
FIG. 3 is a front/rear elevation view showing a preferred embodiment of the adjustment member comprising a barrel.
Figure 4:
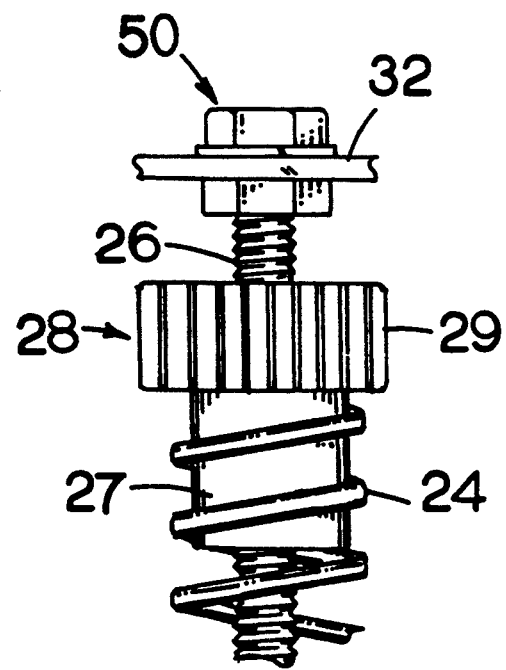
FIG. 4 is a front/rear elevation view showing an alternative preferred embodiment of the adjustment member comprising a knob having a pin.

The drawings illustrate two embodiments of the adjustment member 28. FIG. 3 illustrates an initial design and FIG. 4 illustrates a new approach. The preferred embodiment has not yet been determined. FIG. 3 shows a cap member which receives an end of the spring within the cap. It is possible to provide the top of the cap with a threaded bore to provide spring tension adjustment or to place a nut inside of the cap (hidden from the view) to provide the threaded adjustment of the cap and therefore the adjustment of the spring tension.

FIG. 4 illustrates a variation of the adjustment member 28 in which an extension 27 depends from the knob portion 29. The extension is internally threaded so as to receive the threaded shaft 26. The end of the spring and the extension 27 engage generally as illustrated in the drawing. In both embodiments of the adjustment member it is preferred to have the ridges/depressions to increase the ability to grip the adjustment members when either tightening or loosening the tension of the spring.

In operation, the threaded adjustment member 28 is tightened to compress the spring 24 approximately two inches. Next, the upper support member 12 is attached to the rear axle of the bicycle by utilizing a hole or slot 46 in the intermediate portion 34 of the upper support member 12 and the existing nut and washer combination (not shown) used to hold the wheel on a bicycle. The height of the wheel 18 can be adjusted by moving the wheel 18 within the slot 52.

When properly adjusted, the training wheel 18 should be positioned approximately ¼ inch above the ground. In a preferred embodiment, the adjustable training wheel apparatus 10 has two or more holes or slots 46 and a slot 52, both of which make the adjustable training wheel apparatus 10 capable of being attached to multiple bicycles having different sized wheels. Once the improved adjustable training wheel apparatus 10 is mounted to the bicycle, the rider begins learning to ride the bicycle.

The amount of bank or sway the rider experiences is adjusted by varying the compression of the spring 24 with the threaded adjustment member 28. Generally, the amount of compression is greatest during the earliest stage of training and gradually decreases as the rider begins to acquire the balancing skill required to ride a bicycle. The greatest amount of compression of the spring 24 corresponds to the least amount of sway.

The total or maximum allowed bank is easily altered by replacing threaded shaft 26 with a shorter threaded shaft (to increase total bank angle) or a longer thread shaft (to decrease total bank angle). It will be noted that the stopping member 30 also functions as a cushion to reduce stress on the apparatus when the threaded shaft 26 bottoms out at maximum bank angle.

From the foregoing description those skilled in the art will appreciate that all of the objects of the present invention are realized. An improved adjustable training wheel apparatus is shown and described that is more economical to manufacture and easier to assemble. Adjustment of the spring compression is done with a simple turning motion. The adjustment easily allows the flexibility of the invention to be adjusted in the preferred bank angle range of from approximately 7° to 10°, which is believed to be a bank angle range provides that provides a desired degree of stability.

The improved hinge design substantially reduces the stress on the hinge itself and includes a safety back-up in the unlikely event of a partial or complete failure of the hinge apparatus, thereby minimizing the risk of injury to a rider in the event of a failure of the hinge mechanism.

The improved adjustable training wheel assembly compresses a dampening member attached to the assembly. In a preferred embodiment the attachment to the bicycle or similar wheeled vehicle is accomplished such that the attachment is located on either side of the point of attachment of the assembly to the bicycle.

The improved adjustable training wheel assembly allows an adjustment of the bank angle by merely changing from one standard bolt length to another standard bolt length. The longer or shorter bolt will bottom out on the stopping member at a different bank angle.

In a preferred embodiment the stopping member 30 is rubber. It will be understood that the stopping member serves the dual role of bank angle stop and spring retainer (as illustrated in the drawings). The reverse assembly hinges 21 also provide hinge stress relief by their design. The mounting holes in the intermediate portion of the upper support member preferably allow attachment of the invention to a 20" axle and a 16" axle of a conventional bicycle.

While specific embodiments have been shown and described, many variations are possible. The particular shapes and dimensions may be changed if necessary to suit other equipment with which the invention is used. The strut, spring, adjustment and knob, and stopping member materials may vary although metal and plastic and rubber is preferred. The final durometer of the rubber (or equivalent material) can be determined to suit the particular application. It is conceivable that another dampening member other than a coil spring may be used.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. An improved adjustable training wheel apparatus in combination with a bicycle comprising:

an upper support member having an upper portion, an intermediate portion, and a lower portion, the lower portion of the upper support member having at least one slotted hole;

a lower support member having an upper portion, a first intermediate portion, a second intermediate portion, and a lower portion, the upper portion of the lower support member overlapping the lower portion of the upper support member;

a hinge attaching the lower portion of the upper support member to the upper portion of the lower support member;

a strut assembly flexibly attaching the upper portion of the upper support member to the second intermediate portion of the lower support member; and a wheel rotatably attached to the lower portion of the lower support member;

wherein the hinge is attached to the upper and lower support members by a plurality of threaded members, at least one of said threaded members received within said at least one slotted hole providing clearance allowing the hinge to pivot without obstruction due to the threaded members.

2. The improved adjustable training wheel apparatus of claim 1 wherein the upper support member comprises a substantially C-shaped frame.

3. The improved adjustable training wheel apparatus of claim 1 wherein the lower support member comprises a substantially arch shaped frame.

4. The improved adjustable training wheel apparatus of claim 1 wherein the hinge comprises an offset hinge such that the overlapping upper portion of the lower support member attached to the lower portion of the upper support member pivots without obstruction.

5. An improved adjustable training wheel apparatus in combination with a bicycle comprising:

an upper support member having an upper portion, an intermediate portion, and a lower portion, the lower portion of the upper support member having at least one slotted hole;

a lower support member having an upper portion, a first intermediate portion, a second intermediate portion, and a lower portion, the upper portion of the lower support member overlapping the lower portion of the upper support member;

a hinge attaching the lower portion of the upper support member to the upper portion of the lower support member;

a strut assembly flexibly attaching the upper portion of the upper support member to the second intermediate portion of the lower support member; and a wheel rotatably attached to the lower portion of the lower support member;

wherein said strut assembly further comprises:

a threaded shaft having a head end, the head end attached to the upper portion of the upper support member;

a partially compressed spring surrounding the threaded shaft, the spring having an upper end and a lower end;

a stopping member attached to the second intermediate portion of the lower support member, the lower end of the spring surrounding the stopping member such that the stopping member secures the lower end of the spring to the second intermediate portion of the lower support member, the stopping member contacting the threaded shaft when compression of the spring is increased thereby substantially stopping motion; and a threaded adjustment member received on the threaded shaft, the adjustment member securing the upper end of the spring within the strut assembly such that when the adjustable member is rotated about the threaded shaft the compression of the spring changes.

6. The improved adjustable training wheel apparatus of claim 5 wherein the threaded adjustment member has an inner surface and an outer surface, the outer surface of the adjustment member is textured.

7. The improved adjustable training wheel apparatus of claim 6 wherein the threaded adjustment member comprises a barrel which receives the upper end of the spring such that the threaded adjustment member secures the upper end of the spring within the strut assembly.

8. The improved adjustable training wheel apparatus of claim 6 wherein the threaded adjustment member comprises a knob having a pin, the upper end of the spring surrounding the pin such that the adjustment member secures the upper end of the spring within the strut assembly.

9. The improved adjustable training wheel apparatus of claim 5 wherein the stopping member is comprised of rubber.

10. The improved adjustable training wheel apparatus of claim 5 wherein the combination of the threaded shaft and the stopping member restrict a bank angle from approximately 7 to approximately 10 degrees.

* * * * *